CHIP CHANGING APPARATUS

Filed Jan. 24, 1966 3 Sheets-Sheet 1

INVENTORS
Nils H. Bergfelt
Vernon C. Spellman
BY
Fehr and Swain
Attorneys

INVENTORS
Nils H. Bergfelt
BY Vernon C. Spellman
Fehr and Swain
Attorneys

INVENTORS
Nils H. Bergfelt
Vernon C. Spellman
BY Fehr and Swain
Attorneys

United States Patent Office 3,387,742

Patented June 11, 1968

3,387,742

CHIP CHANGING APPARATUS

Nils H. Bergfelt and Vernon C. Spellman, Santa Rosa, Calif., assignors to Optical Coating Laboratory, Inc., Santa Rosa, Calif., a corporation of California Filed Jan. 24, 1966, Ser. No. 522,697
14 Claims. (Cl. 221—67)

ABSTRACT OF THE DISCLOSURE

Chip changing apparatus which rotates having a cage and a cage ring and means for causing relative movement between the cage and the cage ring to dispense a chip.

This invention relates to a chip changing apparatus and method and more particularly to a rotatable chip changing apparatus and method.

In the placing of coatings on substrates, it is very important to be able to control the depth to which each layer is deposited very accurately. Several types of devices are available for this purpose. One such device uses a glass disc behind a shield provided with a hole. The glass disc is indexed for each layer. Another device drops out a chip after each layer. In the devices thus far provided, it has been found that they are difficult to use and that they require a precisely cut chip which is difficult and expensive to obtain. There is, therefore, a need for a new and improved chip changing apparatus which does not require such precisely cut chips.

In general, it is an object of the present invention to provide a chip changing apparatus and method which does not require the use of precisely cut chips.

A further object of the invention is to provide a chip changing apparatus of the above character in which the chip is rotating during deposition.

A further object of the invention is to provide a chip changing apparatus of the above character in which the chip receives a uniform coating.

A further object of the invention is to provide a chip changing apparatus of the above character which makes possible a center drive for the same.

Additional features and objects of the invention will appear from the following description in which the preferred embodiment is set forth in detail in conjunction with the accompanying drawings.

Referring to the drawings.

Figure 1:
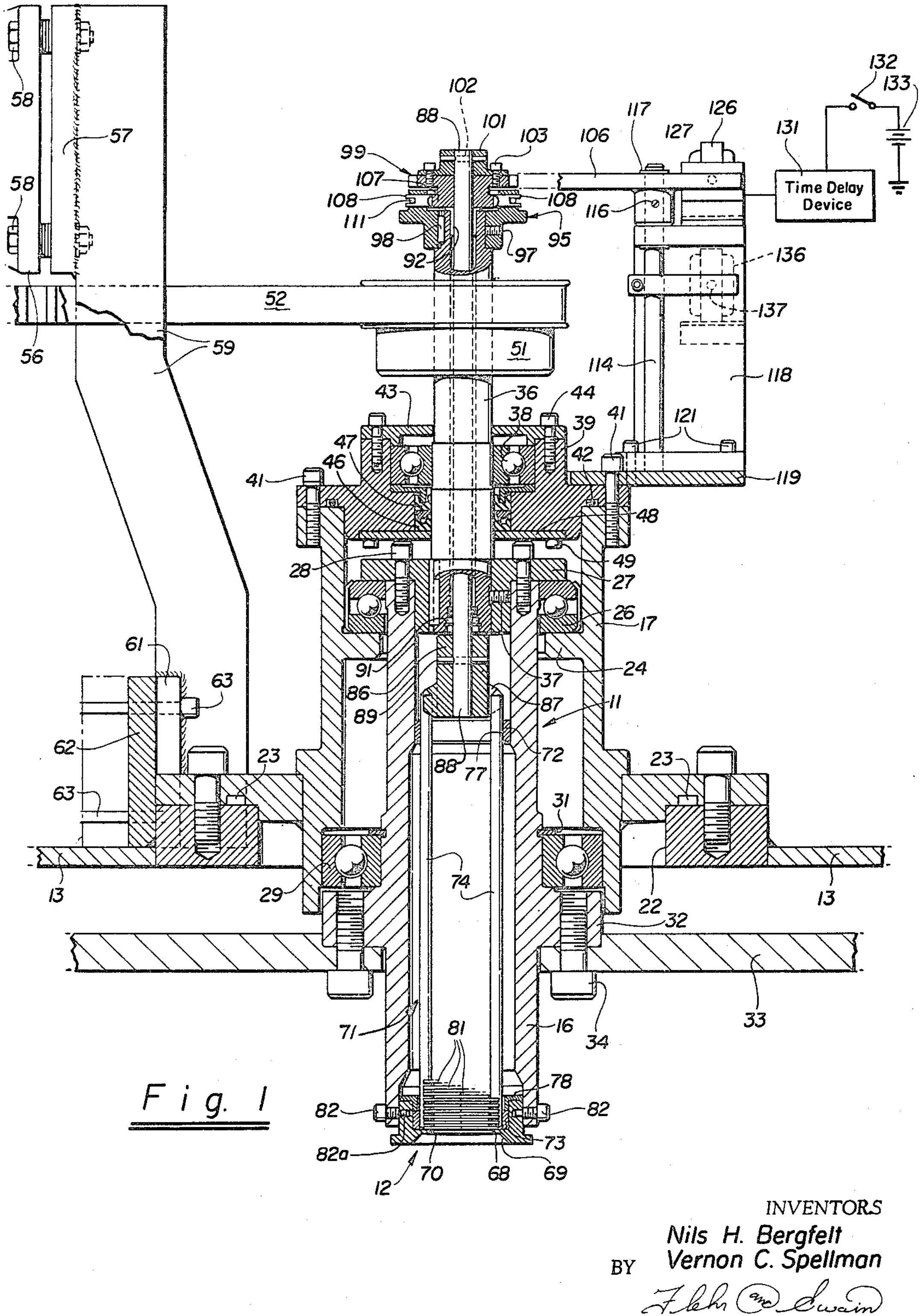
FIGURE 1 is a cross-sectional view of a chip changing apparatus incorporating the present invention.
Figure 2:
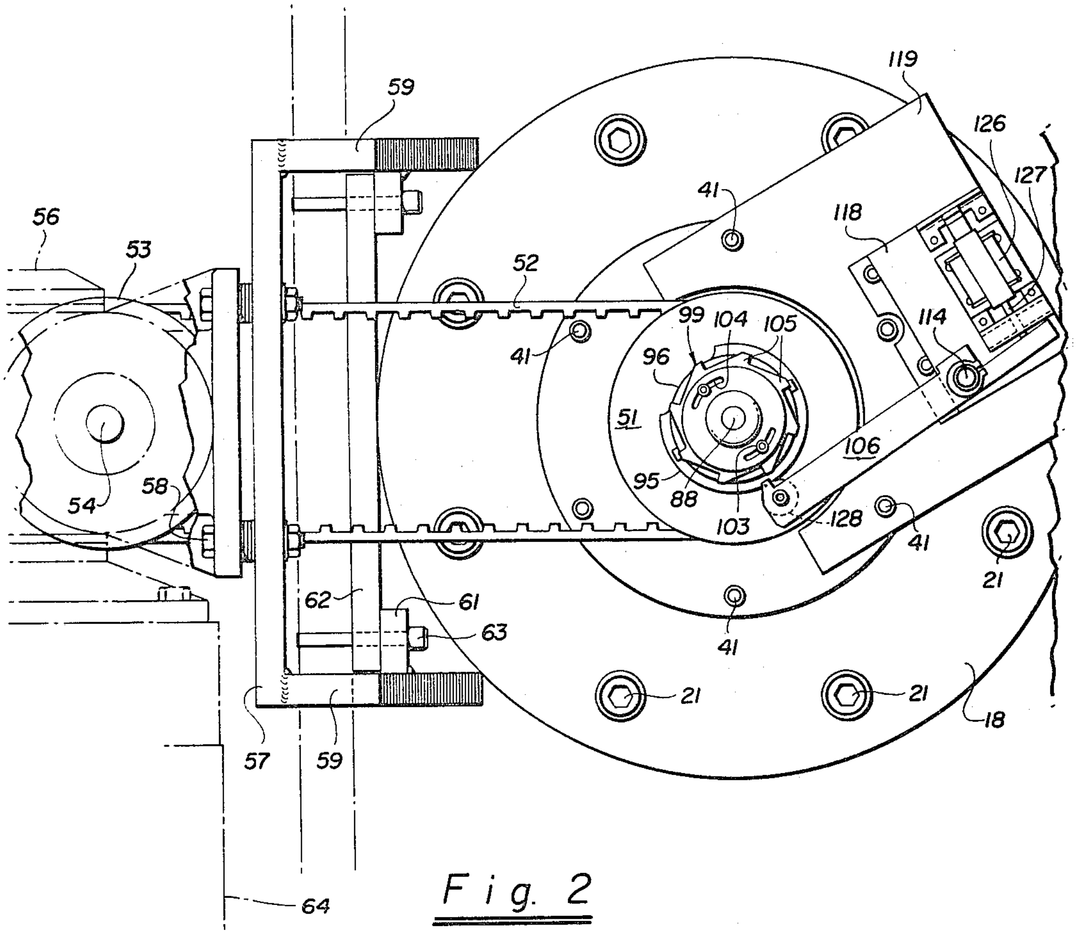
FIGURE 2 is an enlarged top plan view of the chip changing apparatus shown in FIGURE 1.

In general, the chip changing apparatus is utilized for changing substantially planar chips having a predetermined planar configuration with at least three corners. The chip changing apparatus consists of a cage ring which has an opening therein with a configuration permitting a chip to pass through while lying in a substantially horizontal plane. A cage is disposed in the cage ring and has a configuration which is adapted to receive a plurality of the chips with the chips stacked one above the other and with alternate chips being out of registration with the chip immediately below. Means is provided for causing relative movement between the cage and the cage ring whereby the chips are permitted to drop one by one from said cage, the opening in the cage has a conformation such that only the lowermost chip in the cage can drop from the cage by such movement and so that the corners of the chip immediately above the chip being dropped from the cage overlie the cage ring and are not in registration with the opening.

More particularly as shown in the drawings, the chip changing apparatus consists of a spindle assembly 11 which carries a removably mounted cage assembly 12. The spindle assembly 11 is mounted in the top wall 13 of the housing or chamber with which the chip changing apparatus is to be used as, for example, a coating machine which is utilized for depositing various types of coatings upon substrates in a vacuum chamber.

The spindle assembly 11 consists of a cylindrical spindle 16 which is rotatably mounted in a bearing housing 17. The bearing housing is secured to a mounting plate 18 by suitable means such as welding. The mounting plate is secured to a mounting ring 19 secured to the top wall 13 by means of screws 21. The mounting ring 19 forms an opening 22 into the chamber below the wall 13 and through which the bearing housing 17 extends. Suitable sealing means is provided between the mounting plate 18 and the mounting ring 19 and consists of O-rings 23 disposed between the mounting plate 18 and the mounting ring 19.

The bearing housing 17 is provided with an inwardly extending flange 24 which carries a thrust ball bearing assembly 26. A flanged thrust plate 27 overlies the ball bearing assembly 26 and is secured to the upper end of the spindle 16 by screws 28. A radial ball bearing assembly 29 is mounted in the lower portion of the bearing housing 17 and engages an intermediate portion of the spindle 16 as shown in FIGURE 1. The ball bearing assembly 29 is held in place by a snap ring 31. The spindle 16 is provided with a flange 32 on which other operative parts can be mounted. For example, as shown in FIGURE 1, a rack base 33 can be secured to the flange 32 by cap screws 34. The rack base can be utilized for carrying the substrates which are to be coated and the coating which is to be monitored by the use of the chip changing apparatus.

Means is provided for rotating the spindle and consists of a drive shaft 36 which has its lower extremity secured to the thrust plate 27 by suitable means such as a set screw 37. The drive shaft 36 is supported by a bearing assembly 38 mounted in a top plate 39 and secured to the top of the bearing housing 17 by screws 41. Suitable sealing means is provided between the top plate 39 and the bearing housing 17 and consists of O-rings 42 disposed between the top plate 39 and the bearing housing 17. A top cover plate 43 is secured to the top plate 39 by cap screws 44 and serves to hold the bearing assembly 38 in place. A pair of U-cup seals 46 and 47 are mounted within the top plate 39 and are held in place by a bottom retaining plate 48 secured to the bottom of the top plate by cap screws 49.

A timing pulley 51 is secured to the drive shaft 36 and is driven by a timing belt 52. The timing belt 52 is driven by a timing pulley 53 mounted on the output shaft 54 of a speed reducer 56. The speed reducer 56 is secured to a mounting plate 57 by suitable means such as bolts 58. The mounting plate 57 is carried by a pair of vertical arms 59 which are provided with ears 61 on their lower extremities. The ears 61 are secured to a plate 62 by screws 63. The plate 62 is affixed to the top wall 13 by suitable means such as welding. A motor 64 is mounted on the speed reducer 56 and is supported thereon and serves to drive the speed reducer. It can be seen that as the motor is operated, the spindle 16 is rotated in a timed relationship with respect to the operation of the motor.

Figures 4, 5, 6:
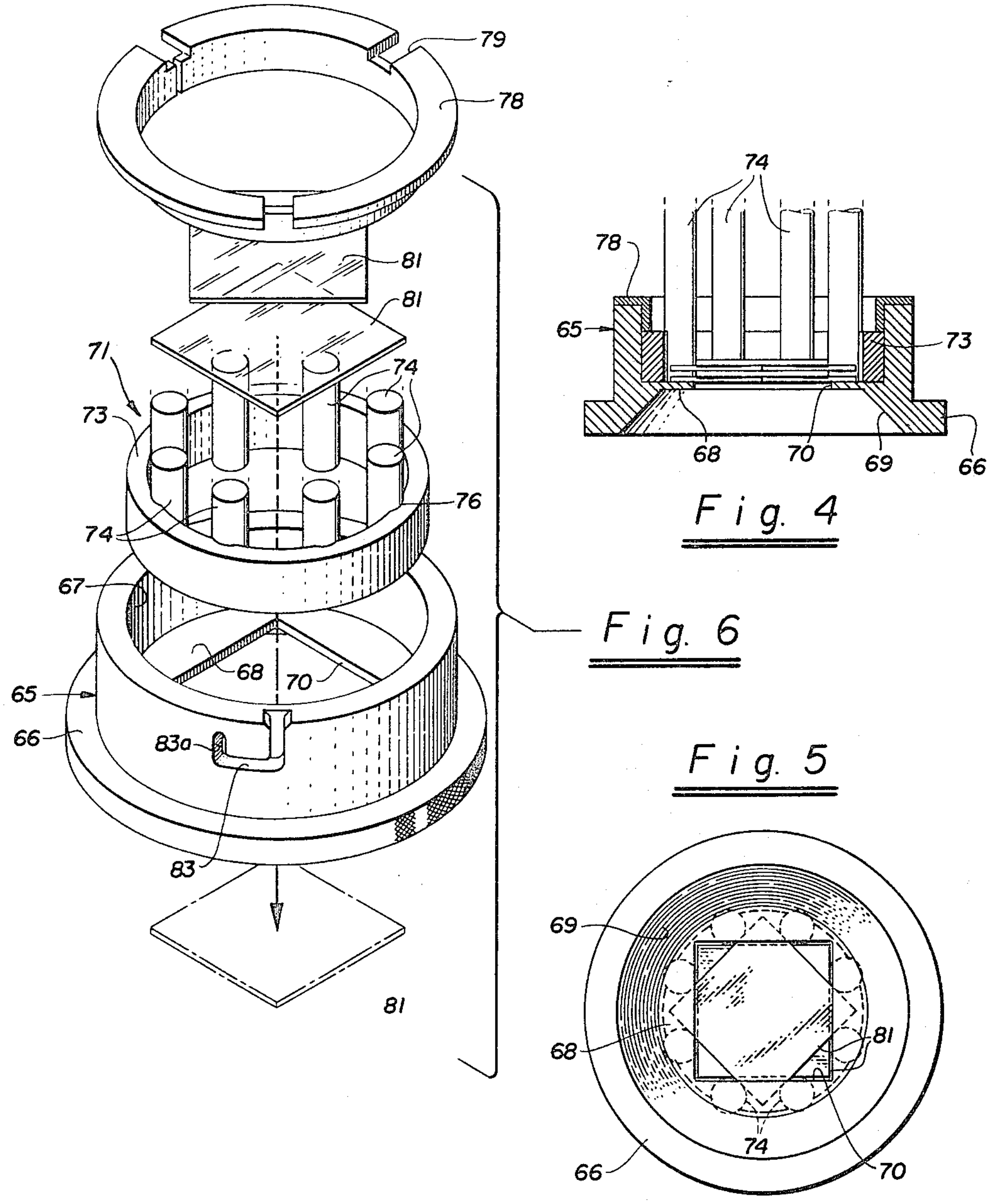
FIGURE 4 is a partial cross-sectional view of the chip holder or cage assembly for holding the chips.
FIGURE 5 is a bottom plan view of the chip holder or cage assembly shown in FIGURE 4.
FIG. 6 is an exploded view of the chip holder or cage assembly shown in FIGURE 4.

A cage assembly 12, which is removably mounted in the spindle assembly, consists of a collar-like member 65. As can be seen particularly in FIGURE 6, the collar-like member is substantially cylindrical and is provided with a radially extending knurled flange 66 on its lower extremity. The collar-like member 65 is formed with a cylindrical recess 67 which terminates adjacent a lower plate 68 which is formed as an integral part of the collar-like member 66 intermediate the upper and lower extremities of the same. The member 65 is also formed with an outwardly inclined conical recess 69 below the plate 68. An opening 70 is provided in the plate 68 of the member 66 and has a configuration which is adapted to permit a chip to pass therethrough while lying in a substantially horizontal plane as hereinafter explained. In general, it can be seen that it is preferable that the opening 70 have a configuration which is substantially identical to that of the chip. However, this is not absolutely necessary as hereinafter explained.

The cage assembly 12 also includes a cage 71 which consists of upper and lower retaining rings 72 and 73. A plurality of cylindrical rods 74 are spaced circumferentially within the rings 72 and 73 and have their lower ends disposed in equally spaced arcuate recesses 76 provided in the lower ring 73 and are secured therein by suitable means such as welding. Portions of the rods 74 adjacent the upper extremities of the same are similarly disposed in arcuate recesses 77 provided in the upper retaining ring 72 and are secured therein by suitable means such as welding. The upper ends of the rods 74 are pointed as shown particularly in FIGURE 1.

The lower end of the cage 71 is normally disposed within the collar-like member 65 and is retained therein by a split flanged retaining ring 78 which has its lower extremity engaging the retaining ring 73 and has its flange overlying the collar-like member 66. The ring 73 is provided with spaced slots 79 in the flange for a purpose hereinafter described.

The cage assembly 12 is adapted to receive a plurality of chips 81 stacked one above the other. As shown in FIGURE 1, the chips 81 are formed of a suitable material such as panes of glass which have substantially planar upper and lower surfaces and which are provided with at least three corners. It is preferable that the chips 81 be substantially the same thickness. However, with the present invention, this is not necessary.

The cage assembly 12 is constructed in such a manner that the chips 81 can be stacked one above the other within the cage assembly with alternate chips being out of registration with each other. Thus, with four-cornered chips such as shown in the drawing, it is necessary that the rods 74 be positioned so that one be able to offset alternate chips with respect to each other by a suitable angle as, for example, an angle of 45°. With three-cornered or triangular chips, the rods 74 should be arranged so that the alternate chips could be offset with respect to each other by a suitable angle such as 60°.

The cage assembly 12 is loaded with the chips stacked one above the other with alternate chips being offset with respect to each other. During loading, the cage 71 is rotated within the collar-like member 65 so that the lowermost chip 81 is not in registration with the opening 70 provided in the collar 65. When the cage 71 is in this position, the corners of the lowermost chip 81 will engage the plate 68 which will prevent the chip from falling through the opening 70.

The cage assembly 12 is adapted to be retained within the hollow spindle 16 by suitable means such as a pair of screws 82 threaded into the side wall of the spindle and having projecting portions 82*a* which extend into the spindle. The collar-like member 66 is provided with a pair of L-shaped slots 83 which are adapted to receive the portions 82*a*. The slots 79 in ring 78 are in registration with the L-shaped slots 83 provided in the collar-like member 65. Thus, the cage assembly can be positioned within the spindle 16 merely by moving the slots 83 into registration with the portions 82*a* and then moving the entire cage assembly upwardly and rotating the same slightly and then permitting the portions 83*a* of the slot 83 to lower over the portions 82*a* to hold the cage assembly 12 within the spindle 16.

Means is provided for causing relative movement between the cage 71 and the collar-like member 65 and consists of a coupling 86 formed of suitable material such as Teflon which is provided with a pair of outwardly extending ears 87 on its lower extremity which are adapted to be disposed between the spaces provided between the upper extremities of the rods 74 of the cage 71. The coupling 86 is secured to an actuating shaft 88 by suitable means such as pin 89. The shaft 88 is rotatably mounted within the drive shaft 36 by a lower bushing 91 and an upper bushing 92.

For changing chips, means is provided for preventing rotation of the actuating shaft 88 while the main drive shaft 36 is rotating and consists of a cam 95 which has a recess 96. The cam 95 is secured to the main drive shaft 36 by a set screw 97 and by a key 98. A ratchet wheel 99 is mounted above the cam 96 and is secured to the actuating shaft 88 by a coupling 101. The coupling 101 is secured to the actuating shaft 88 by a pin 102. The coupling 101 is adjustably secured to the ratchet wheel 99 by screws 103 extending through recesses 104 in the coupling 101 to permit angular adjustment of the coupling 101 with respect to the ratchet wheel 99.

The ratchet wheel 99 is provided with an upper row of teeth 105 which are adapted to be engaged by a pawl 106. The ratchet wheel 99 is also provided with a lower row of circumferentially spaced recesses 107 which are adapted to be engaged by a pair of detent pins 108 which are mounted in diametrically opposed holes provided in the cam 96. The detent pins 108 are yieldably urged into engagement with the recesses 107 provided in the ratchet wheel 99 by suitable means such as a resilient O-ring 111 disposed in an annular recess 112 provided in the cam 96 and also in slots 113 provided in the outer ends of the detent pins 108. The pawl 106 is secured to a shaft 114 by a set screw 116. It is also retained on the shaft by a retaining ring 117. The shaft 114 is rotatably mounted in a bracket 118 which is secured to a mounting plate 119 by screws 121. The plate 119 is mounted upon the top bearing housing 39 by the screws 41.

Figure 3:
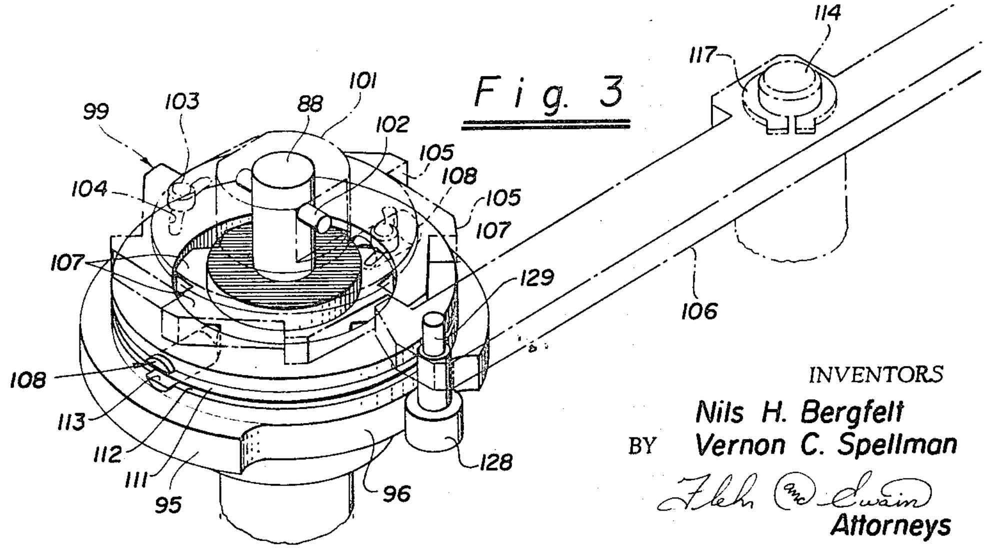
FIGURE 3 is an isometric view of a portion of the chip changing apparatus shown in FIGURE 2.

Means is provided for yieldably urging the pawl 106 into engagement with the ratchet wheel 99 and consists of a solenoid 126 which is mounted upon the bracket 118. The solenoid is provided with a plunger 127 which extends through the bracket and which is adapted to engage the pawl 106 to urge the pawl into engagement with the teeth 105 on the ratchet wheel 99. Means is provided for moving the pawl out of engagement with the ratchet wheel 99 to terminate the rotation of the main shaft 36 and consists of a cam follower roller 128 which engages the cam 95 mounted upon the main shaft 36 and which is adapted to travel in the recess 96 provided on the cam 95. The cam follower roller 128 is rotatably mounted upon a pin 129 mounted in the forward extremity of the pawl 106 as shown particularly in FIGURE 3. Means is provided to insure that the solenoid 126 remains energized for a period of time sufficient to permit the pawl 106 to engage one of the teeth 105 and consists of a time delay device 131 which is energized by a switch 132 connected to a battery 133.

Additional supplemental means is provided for moving the pawl 106 out of engagement with the teeth 105 and consists of a solenoid 136 mounted upon the bracket 118. The solenoid 136 is provided with a plunger 137 which is connected to an arm 138 clamped on the shaft 114 by a screw 139.

Operation and use of the chip changing apparatus and the method may now be briefly described as follows. Let it be assumed that the chip changing apparatus is mounted in a coating machine and that it is desired to utilize the chip changing apparatus in conjunction with the monitoring of the coating deposited upon substrates carried by the rack 33 within the coating machine. Before placing the coating machine in operation, the cage assembly 12 is loaded with chips 81 in such a manner so that the chips are stacked one above the other and that alternate chips are out of registration with each other. As soon as the cage assembly has been loaded with the desired number of chips, the cage assembly 12 is inserted into the spindle assembly 11 in the manner hereinbefore described.

Assuming that the substrates have been mounted on the rack carried by the rack base 33, the machine is placed in operation by energizing the motor 64. Operation of the motor 64 causes rotation of the main shaft 36 which, in turn, causes rotation of the spindle assembly 11 and the rack carried thereby. During normal operation, the pawl 106 is out of engagement with the teeth 105 of the ratchet wheel 99 and for that reason, the cage assembly 12 rotates with the spindle assembly 11. The vapor stream within the coating machine which impinges upon the substrates also passes through the opening 70 provided in the cage assembly and impinges upon the exposed surface of the lowermost chip 81 within the cage assembly. During the time that the layer is being deposited upon the lowermost chip 81, it is being continuously monitored by suitable monitoring apparatus such as that described in copending application Ser. No. 321,888, filed Nov. 6, 1963. As soon as it has been determined that a layer of sufficient thickness of one type of material has been deposited upon the substrates by monitoring the thickness of the layer being deposited upon the chip 81, the vapor stream from the source is terminated.

Thereafter, another material is evaporated within the chamber to cause vapors of another material to impinge upon the substrates. Before this is commenced, it is desirable to drop the lowermost chip 81 from the chip changer so that the next layer can be monitored by the next chip. This is accomplished by energizing the solenoid 126 by closing switch 132 which causes the pawl 106 to be moved toward the ratchet wheel 99. However, the pawl 106 cannot move into engagement with one of the teeth 105 of the ratchet wheel 99 until the cam follower roller 128 drops into the recess 96 provided on the cam 95 being continuously driven by the main shaft 36. As soon as the roller 128 drops into the recess 96, the pawl 106 moves into engagement with one of the teeth 105 and thereby prevents further rotation of the ratchet wheel 99. This, in turn, stops rotation of the actuating shaft 88 and the cage assembly 12. The main shaft 36 continues to rotate, and for that reason there is relative movement between the cage assembly 12 and the spindle assembly 11. This relative movement occurs through a predetermined angle which is determined by the type of chips being used. Where rectangular chips are used having four corners, an angle of 45° is the predetermined angle. By causing relative rotation through the 45°, the lowermost chip 81 within the chip changer is moved into registration with the opening 70 provided in the cage assembly and it drops through the opening 70 where it is collected by a chip collector (not shown). As the chip is dropping through the opening 70, the cam follower 128 travels out of the recess 96 to move the pawl 106 out of engagement with the tooth 105 of the ratchet wheel with which it has been in engagement to again permit the ratchet wheel 99 together with its actuating shaft 88 to travel with the main shaft 36 to thereby stop the relative movement between the cage assembly 12 and spindle assembly 11. This conjoint movement of the spindle assembly 11 and the cage assembly 12 occurs because the detent pins 108 and the recesses 112 which they engage are so arranged that the detents move into engagement at the time that the cam follower 128 moves out of one of the recesses 96. Thus, as soon as the cam follower 128 moves out of the recess, the detent pins 11 are in engagement with the recesses 112 to thereby cause the spindle assembly and cage assembly 12 to move conjointly. At the time that the pawl 106 first engages one of the teeth 105 when the cam follower 128 moves into the recess 96, the detent pins are moved out of the recesses 112 against the force of the yieldable means provided by the O-ring 111.

The coating operation continues until it is again determined that a layer of the desired thickness has been deposited upon the lower surface of the chip now exposed through the opening 70 in the chip changing apparatus. The next chip in the chip changing apparatus is exposed for the next layer by again actuating the solenoid 126 to cause the pawl 106 to move into engagement with the ratchet wheel 99 to again cause relative movement of the cage assembly 12 with respect to the spindle assembly to cause the previously exposed chips to drop through the opening 70. Only one chip at a time drops through the opening 70 because, as previously explained, the alternate chips are angularly displaced with respect to each other. The chip immediately above the opening 70 is out of registration with the opening and, therefore, its corners engage the plate 69.

The solenoid 126 is only energized for a sufficient period of time by the time delay device 131 to ensure that the pawl 106 has engaged one of the teeth 105. In the event it is desired to move the pawl 106 out of engagement with the ratchet wheel 105 by means other than the cam 95 and the cam follower 128, the solenoid 131 is then energized to pull on the arm 132 to move the pawl 106 out of engagement with the ratchet wheel 99.

The chip changing apparatus herein disclosed has many advantages. As will be noted, it is continuously rotating during the time that the layers are being deposited which prevents runoff across the face of the chip. In other words, a uniform coating is provided on the chip 81 which makes it possible to accurately measure reflectivity. The rotating chip changing apparatus also makes it possible to utilize the same in conjunction with a rotating system which makes it possible to utilize a center drive for the chip changing apparatus. In addition, the chip changing apparatus is relatively simple in that it is possible by relatively simple means to separate the chips from each other and to only permit one chip at a time to drop from the chip changing apparatus. Also, with a chip changing apparatus, it is not necessary that the chips be accurately sized. In other words, the chips can vary substantially in size and thickness without causing malfunctions in the chip changing apparatus.

Because of the construction of the chip changing apparatus, it is not possible to over-rotate which could possibly cause jamming of the chip in the aperture as it is falling through.

We claim:

1. In a chip changing apparatus for changing substantially planar chips having a predetermined planar configuration with at least three corners, a cage ring having an opening therein with a configuration permitting a chip to pass through while lying in a substantially horizontal plane, a cage disposed in said cage ring and having a configuration for receiving a plurality of said chips with the chips stacked one above the other and with alternate chips being out of registration with the chip below, the configuration of the opening in the cage ring being such that only one chip at a time can pass through the opening with the chips so arranged, means for rotating said cage and said cage ring as a unit and means including motive means for causing relative movement between said cage and said cage ring while they are being rotated by said means for rotating to cause the lowermost chip to be moved into registration with the opening and to permit the same to drop through the opening.

2. A chip changing apparatus as in claim 1 wherein said means for rotating said cage and said cage ring includes a spindle and means rotatably mounting said spindle, said cage and said cage ring being carried by said spindle.

3. A chip changing apparatus as in claim 1 wherein said cage comprises upper and lower retaining rings, and a plurality of rods secured to said retaining rings, said rods being spaced circumferentially to permit said chips to be staggered with respect to each other.

4. A chip changing apparatus as in claim 3 wherein means engaging said cage includes a coupling having ears adapted to extend between the rods of the cage.

5. A chip changing apparatus as in claim 1 wherein said cage is removably mounted in said cage ring.

6. In a chip changing apparatus for changing substantially planar chips having a predetermined planar configuration with at least three corners, a cage ring having an opening therein with a configuration permitting a chip to pass through while lying in a substantially horizontal plane, a cage disposed in said cage ring and having a configuration for receiving a plurality of said chips stacked one above the other with alternate chips being out of registration with the chip below, the configuration of the opening in the cage ring being such that only one chip at a time can pass through the opening with the chips so arranged, and means for causing relative movement between said cage and said cage ring to cause the lowermost chip to be moved into registration with the opening and to permit the same to drop through the opening, said means for causing relative movement between said cage and said cage ring comprising a hollow spindle, means for rotating the spindle, means for removably mounting said cage ring and said cage in said spindle whereby said cage ring is secured to said spindle, said cage being rotatable in said cage ring, and means engaging the cage for preventing rotation of the cage for a predetermined angle to cause said cage to be shifted until the lowermost chip in the cage is in registration with the opening in the cage ring.

7. A chip changing apparatus as in claim 6 wherein said means for rotating said spindle includes a main shaft and wherein said means for preventing rotation of the cage includes an actuator shaft releasably connected to said cage, a cam mounted on said main shaft, a ratchet wheel secured to said actuator shaft, detent means carried by the cam and adapted to engage the ratchet wheel to cause the actuator shaft to rotate with the main shaft, and pawl means movable into engagement with the ratchet wheel to prevent rotation of the ratchet wheel and the actuating shaft and cage ring connected thereto.

8. A chip changing apparatus as in claim 7 wherein said cam is provided with a recess, a cam follower carried by the pawl and adapted to travel into the recess in said cam, said recess being dimensioned so that said pawl can only move into engagement with the ratchet wheel when the cam follower is in one of said recesses, said recess also being dimensioned so that said cage and cage ring are shifted relative to each other so that the lowermost chip is moved precisely into registration with the opening in the cage ring.

9. A chip changing apparatus as in claim 7 wherein said detent means includes a detent member slidably mounted in said cam member, said ratchet wheel having recesses adapted to receive the detent member, and means yieldably urging said detent member toward said recesses in said sprocket wheel.

10. A chip changing apparatus as in claim 7 wherein said actuator shaft and said main shaft are concentric.

11. A chip changing apparatus as in claim 6 together with a bearing housing, and means rotatably mounting said spindle in said bearing housing.

12. A chip changing apparatus as in claim 7 together with solenoid means for actuating said pawl including a solenoid for yieldably urging said pawl into engagement with said ratchet wheel and time delay means for retaining said solenoid energized for a predetermined period of time.

13. In a chip changing apparatus for use in a coating apparatus having a chamber and a substrate carrier, the chips having a predetermined planar configuration with at least three corners, a bearing housing mounted upon the chamber wall, a spindle rotatably mounted within the bearing housing, a main shaft connected to the spindle, means for driving the main shaft in a timed relationship, an actuator shaft mounted within the main shaft, a cam mounted on the main shaft, a sprocket wheel connected to the actuator shaft, detent means carried by the cam and adapted to engage the sprocket wheel to cause the sprocket wheel and the cam to rotate conjointly, a cage assembly removably mounted in said spindle, said cage assembly comprising a cage and a cage ring with the cage being rotatably mounted in the cage ring, means securing the cage ring to the spindle, said spindle being centrally disposed in the substrate carrier, a pawl, and means for yieldably urging said pawl into engagement with said sprocket wheel to prevent the rotation of said sprocket wheel and the actuator shaft connected thereto with respect to the spindle during a predetermined angle of rotation of the spindle.

14. Apparatus as in claim 13 wherein said spindle is centrally disposed in said substrate carrier.

References Cited

UNITED STATES PATENTS

| | | | |
|---|---|---|---|
| 879,217 | 2/1908 | Thrasher | 221—67 X |
| 889,389 | 6/1908 | Murray | 221—67 X |
| 1,434,057 | 10/1922 | Horwitt | 221—297 X |

FOREIGN PATENTS

| | | |
|---|---|---|
| 75,612 | 8/1893 | Germany. |

ROBERT G. SHERIDAN, *Primary Examiner.*

GERALD M. FORLENZA, *Examiner.*

F. E. WERNER, *Assistant Examiner.*